United States Patent [19]

Reglebrugge et al.

[11] Patent Number: 5,451,030

[45] Date of Patent: Sep. 19, 1995

[54] METERING VALVE

[75] Inventors: Michael Reglebrugge, Fountian Inn; Craig Ashton, Greer, both of S.C.

[73] Assignee: T&S Brass and Bronze Works, Inc., Travelers Rest, S.C.

[21] Appl. No.: 345,645

[22] Filed: Nov. 28, 1994

[51] Int. Cl.6 .................. F16K 21/04; F16K 31/143; F16K 47/02
[52] U.S. Cl. ........................................ 251/51; 251/52
[58] Field of Search ...................... 251/35, 36, 39, 47, 251/48, 51, 52, 54, 55

[56] References Cited

U.S. PATENT DOCUMENTS

| | | | |
|---|---|---|---|
| 92,190 | 7/1869 | Harrison | 251/51 |
| 150,154 | 4/1874 | Harrison | 251/51 |
| 215,701 | 5/1879 | White | 296/32 |
| 231,592 | 8/1880 | Leach | 251/39 |
| 540,347 | 6/1895 | Baker | 251/35 |
| 837,077 | 11/1906 | Kupsch | 251/35 |
| 882,740 | 3/1908 | Brooks | 251/39 |
| 901,583 | 10/1908 | Bowman | 251/39 |
| 1,112,564 | 10/1914 | Schroeder | 251/39 |
| 1,162,957 | 12/1915 | Watrous | 251/39 |
| 1,182,666 | 5/1916 | Eynon et al. | 251/39 |
| 1,273,140 | 7/1918 | Brooks | 251/39 |
| 1,804,137 | 5/1931 | Yates | 251/35 |
| 2,000,297 | 5/1935 | Putnam | 251/35 |
| 2,002,451 | 5/1935 | Gray | 251/51 |
| 2,023,788 | 12/1935 | Miller | 251/35 |
| 2,532,568 | 12/1950 | Myers | 251/33 |
| 2,635,634 | 4/1953 | Thurber, Jr. | 251/35 |
| 2,710,736 | 6/1955 | Miller | 251/51 |
| 3,047,018 | 7/1962 | Lucien | 251/900 |
| 3,065,948 | 11/1962 | Nolan | 251/51 |
| 3,102,711 | 9/1963 | Filliung | 251/54 |
| 3,342,448 | 9/1967 | Parkison | 251/51 |
| 3,400,731 | 11/1968 | McCornack | 251/39 |
| 3,729,167 | 4/1973 | Gulick | 251/39 |
| 3,842,857 | 10/1975 | McCornack | 251/39 |
| 3,933,337 | 1/1976 | Morris et al. | 251/54 |
| 4,272,052 | 6/1981 | Gidner | 251/39 |
| 4,361,168 | 11/1982 | McCornack | 251/51 |
| 4,429,715 | 2/1984 | Goldsmith | 251/51 |
| 4,656,924 | 4/1987 | Chatterjea | 251/51 |
| 4,784,368 | 11/1988 | Koch et al. | 251/51 |
| 4,899,778 | 2/1990 | Laube | 251/35 |
| 4,991,819 | 2/1991 | Laube | 251/35 |
| 5,295,654 | 3/1994 | Laube | 251/39 |

FOREIGN PATENT DOCUMENTS

| | | | |
|---|---|---|---|
| 0018807 | 8/1909 | United Kingdom | 251/52 |
| 0431448 | 7/1935 | United Kingdom | 251/52 |
| 0882394 | 11/1961 | United Kingdom | 251/51 |

*Primary Examiner*—George L. Walton
*Attorney, Agent, or Firm*—Dority & Manning

[57] ABSTRACT

A metering valve includes a valve body with an inlet passage and an outlet passage defined therein, and a movable stem member disposed between the inlet passage and outlet passage. An inner sleeve member is configured within the valve body and has an inner diameter surface defining a chamber, the stem member being movable through the chamber. A piston assembly is disposed within the chamber and is configured with the stem member to move therewith. The piston assembly includes a sealing device which engages with the inner sleeve member inner diameter surface during movement of the piston assembly to the closed mode. A metering passage is defined through the stem member between a location above the sealing device to a location below the sealing device such that the rate of return of the piston assembly from the open mode to the close mode is dependent upon the size of the metering passage. At least one additional vent passage is defined from a location above the sealing device to a location below the sealing device in the closed mode. The vent passage includes at least one hole defined above the sealing device completely through the inner sleeve member, and at least a second hole defined below the sealing device completely through the inner sleeve member. The vent passage is only established upon the sealing device passing across the second hole in its movement from the open mode to the close mode.

15 Claims, 2 Drawing Sheets

METERING VALVE

BACKGROUND OF THE INVENTION

Metering valves are known in the art and have been variously utilized in a number of applications, such as public washrooms, urinals, restaurants, etc., wherever it is desired to control and meter a flow of fluid. Typically, these valves are manually actuated and permit a metered quantity of water to be dispensed before automatically shutting off. The valves are typically spring biased to a closed position with the time required for the valve to return to its closed position corresponding to the time (and thus quantity) fluid allowed to flow through the valve. The valves operate with a pressure chamber, or dashpot, wherein fluid on one side of a piston or similar member must be vented or metered to allow the piston to move to its closed position in order to shut off the valve. Various embodiments are known in the art for metering or venting the pressure chamber for this purpose.

Applicants have determined that the conventional metering valves have a significant problem in that they require periodic purging of the dashpot or pressure chamber to relieve air that eventually builds up in the chamber. If the air is not vented, the valve tends to chatter and will not properly seat in its closed position. In the past, the valves have been purged by disassembling the valve which required significant downtime for the system and excessive man hours.

U.S. Pat. No. 4,899,778 describes a metering valve whose purpose is to attain a crisp automatic shut off of the valve as opposed to a gradual shut off. The valve described includes a head portion which travels through a first segment of travel and then through a second segment of travel is at a greater rate of movement or speed than through the first segment. When the piston member moves from the open mode to the closed mode, the periphery of the piston head portion is in sliding sealing engagement with the interior surface of a first portion of a tubular unit and disengages from the interior surface of the tubular unit during the second segment of travel. The inner dimension of the second portion of the tubular unit has a greater diameter than the first portion which allows the head portion of the piston assembly to disengage from the surface. When such disengagement occurs, resistance to the piston assembly is greatly reduced which enables the piston assembly to move quickly to a fully closed position. U.S. Pat. No. 4,991,819 is similar to the '778 patent and describes internal splines or ribs defined in the interior surface of the second portion of the tubular unit which creates a non-sealing relation between the seal of the piston assembly and the head portion of the tubular unit during the second segment of travel of the piston assembly. Although the '778 patent and '819 patent teach of the desirability of quick and crisp closing of the valve, the embodiments described therein also would likely provide for venting of air entrapped above the sealing piston and, thus, are an attempt to correct the chattering problem with conventional metering valves.

The present invention relates to a relatively uncomplicated alternative solution to venting the pressure chamber which requires significantly less precision in manufacturing and machining as that proposed by the '778 and '819 patents.

OBJECTS AND SUMMARY OF THE INVENTION

It is a principal object of the present invention to provide a metering valve which eliminates chattering.

Another object of the present invention is to provide a metering valve which does not require periodic manual purging.

And still a further object of the present invention is to provide an automatically venting metering valve which significantly reduces maintenance and downtime previously required of such valves.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

In accordance with the objects and purposes of the invention, as embodied and broadly described herein, the apparatus of the present invention comprises an automatically closing self-venting metering valve for metering the flow of a fluid in any number of applications. The valve includes a valve body having an inlet passage and an outlet passage defined therein. A movable stem member is disposed between the inlet passage and outlet passage so as to seal the inlet passage from the outlet passage in a closed mode of the valve. In an open mode of the valve, a fluid path is defined from the inlet passage to the outlet passage. The stem member is biased to the closed mode preferably through a biasing spring.

The valve further includes an inner sleeve member which is configured with the valve body and has an inner diameter surface which defines a pressure chamber or dashpot. The stem member is movable through this chamber. A piston assembly is disposed within the chamber and is configured with the stem member so as to move therewith. The piston assembly is movable to the open mode upon actuation of the valve and subsequently automatically returns to the closed mode upon release of an actuation device. The piston assembly includes a sealing device which is configured to sealingly engage with the inner sleeve member inner diameter surface during movement of the piston assembly to the closed mode.

The valve further includes a metering passage defined through the stem member between a location above the sealing device to a location below the sealing device. This metering passage essentially controls the rate of return of the piston assembly to the closed mode, and thus the amount of fluid which is permitted to flow through the valve.

The valve further includes an outer sleeve member which is concentric about the inner sleeve member. A fluid path is defined between the inner and outer sleeve members. This fluid path may simply be defined by a non-sealing fit between the two sleeve members so that fluid can move between the two members. At least one vent passage is provided in the valve separate from the metering passage to relieve or vent air which may become entrapped above the piston assembly. The vent passage is defined from a location above the sealing device to a location below the sealing device in the closed mode of the valve. The vent passage includes at least a first hole defined above the sealing device completely through the inner sleeve member to the fluid path between the inner sleeve and outer sleeve members, and at least a second hole defined below the sealing device from the fluid path completely through the inner sleeve member in the closed mode of the piston assembly. In this manner, the vent passage is only established upon the sealing device passing across the second hole in its movement from the open mode to the closed mode.

In a preferred embodiment, a plurality of such holes are provided in the inner sleeve member so that more than one vent passage is defined.

In a further preferred embodiment, an adjusting device is provided for variably adjusting the metering passage, thereby adjusting the metering rate of the valve. Preferably, the metering device may comprise a metering screw which is configured through the stem member into the metering passage.

And yet in another preferred embodiment, the outer sleeve member may be formed integral with the valve body. The valve may also preferably include a valve bonnet which is matable with the valve body. In this embodiment, the stem member extends through the valve bonnet.

Preferably, the second hole comprising a component of the vent passage is at a longitudinal distance from the first hole so that the vent passage is not established until the piston assembly has travelled at least one half of the distance from the open mode to the closed mode. Preferably, the hole is at a longitudinal distance so that the vent passage is not established until just before the piston assembly has reached the closed mode. Since the vent passage will affect the rate of closure of the valve causing the valve to close at a quicker rate, it is preferred that the vent passage be established as close to the end of travel of the piston assembly as possible.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

Figure 1:
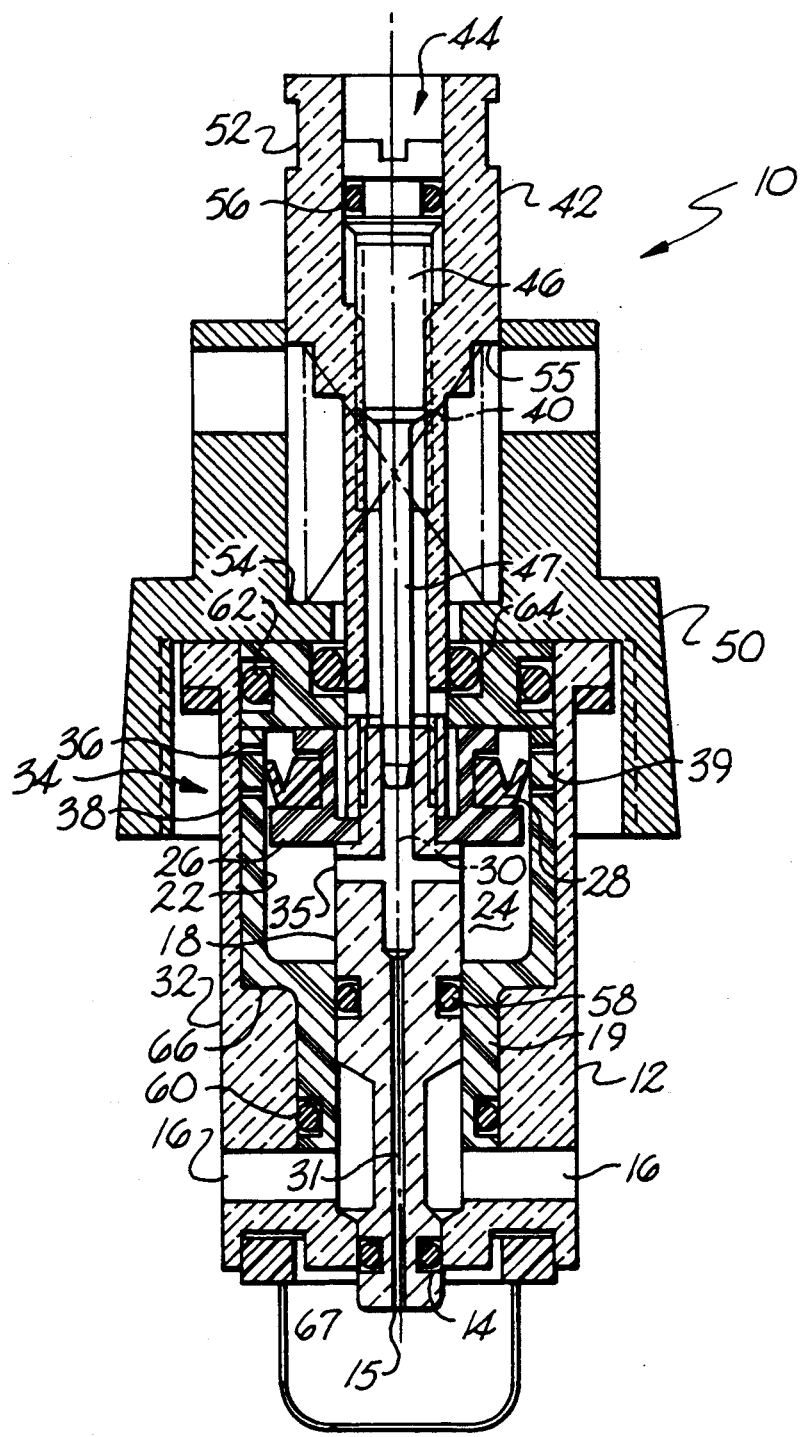
FIG. 1 is a cross-sectional component view of an embodiment of the valve according to the invention shown in its closed mode.
Figure 2:
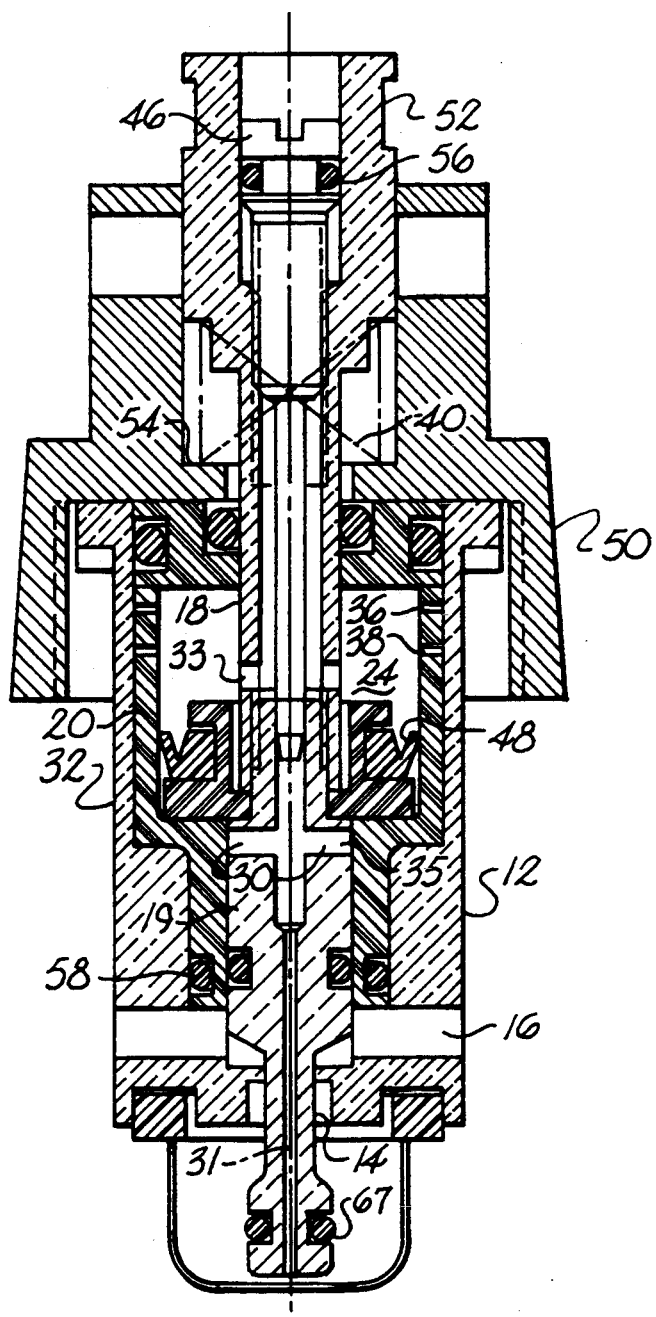
FIG. 2 is a cross-sectional component view of the valve of FIG. 1 shown in its open mode.

Referring to FIGS. 1 and 2, an automatically closing self-venting metering valve 10 is illustrated. Valve 10 may be used in any conventional system wherein it is desired to automatically meter a flow of fluid. For example, the valve is particularly useful in public washrooms. Those skilled in the art will recognize that the present inventive valve has any number of uses.

Valve 10 includes a valve body 12 which defines an inlet passage 14 and an outlet passage 16. A movable stem member 18 is operably disposed between inlet 14 and outlet passage 16. FIG. 1 illustrates the stem member 18 in its closed position. As can be readily seen in the figure, stem 18 with seal 67 seals inlet passage 14 from outlet passage 16. FIG. 2 illustrates the device in its open mode. Valve stem member 18 has moved downwards thereby unsealing inlet passage 14 and allowing fluid to flow through inlet passage 14 and out outlet passage 16.

Valve 10 further includes an inner sleeve member 20 configured with valve body 12. In the embodiment illustrated, inner sleeve member 20 includes a stem portion 19 which is essentially concentric about the lower portion of stem member 18. Stem member 18 is in sliding sealing engagement with the lower stem portion of inner sleeve member 20. An O-ring 58 or similar device is disposed within a groove in stem member 18 to insure a sealing relationship between stem member 18 and the lower stem portion 19 of inner sleeve member 20.

Inner sleeve member 20 includes an inner diameter surface 22 which defines a pressure chamber 24. Stem member 18 is movable through pressure chamber 24. A piston assembly 26 is configured with stem member 18 so as to be longitudinally movable therewith. Piston assembly 26 may be formed integral with the stem member or, for ease of manufacture and assembly, may comprise a separate component which is press-fitted or otherwise fixed to stem member 18. Piston assembly 26 includes a sealing device 28, which is preferably a cup seal 48. Sealing device 28 is configured so that higher pressure fluid in chamber 24 below sealing device 28 will by-pass around the seal to the area above sealing device 28 by simply forcing the flanges of cup seal 48 inward. This arrangement is preferred in that the valve does not require a separate pilot valve to equalize pressure in the chamber above the piston. However, as will be explained fully below, sealing device 28 seals higher pressure fluid in the area above the sealing device from by-passing the seal to the area below the device. Thus, when the piston assembly 26 moves from its open position shown in FIG. 2 to its closed position shown in FIG. 1, the rate of travel of the piston assembly is limited by the manner in which the fluid above the sealing device 28 is metered to the area below the sealing device. It should be understood that sealing device 28 is preferably illustrated as a cup seal 48. However, any manner of conventional sealing devices may be utilized.

Stem member 18 further includes a metering passage 30 which is configured to meter the fluid from above sealing device 28 to the area within chamber 24 below sealing device 28 as piston assembly 26 moves to its closed position. Metering passage 30 is essentially defined as a bore through stem member 18 and includes inlet ports 33 disposed above piston assembly 26 and outlet ports 35 disposed below piston assembly 26. An adjusting device 44 is provided to variably adjust the size of the metering passage, thereby limiting the rate of fluid flow through metering passage 30. Preferably, adjusting device 44 comprises a metering screw 46 which is disposed through the top of stem member 18 and has a needle portion 47 which extends into metering passage 30. By turning screw 46, the metering passage 30 is adjusted to either increase or decrease the rate of return of piston assembly 26 to its closed position. For example, if metering screw 46 is turned so as to further restrict metering passage 30, the amount of fluid which can pass from above piston assembly 26 to below the assembly will be further restricted causing the return of piston assembly 26 to its closed position to take a relatively longer time. Thus, the relative time that valve 10 remains open is extended.

Valve 10 also includes an actuation device for manually opening the valve. In the embodiment illustrated, actuation device 42 consists of a plunger 52 which is formed with stem member 18. Plunger 52 is biased to the closed position of the valve through a spring 40 (dashed lined) which is disposed between a seat 54 and a seat 55. In the embodiment illustrated, the actuation device (plunger 52) is shown as being formed integral with stem member 18. It should be understood that this is but a mere preferred embodiment and the actuation device may be configured with the stem member or piston assembly in any conventional manner so as to move the piston assembly to its open position.

Stem member 18 also includes an orifice 31 defined in the lower stem portion thereof. Orifice 31 is in fluid communication with metering passage 30 and is open at all times to inlet fluid pressure at opening 15. Thus, chamber 24 is always subjected to inlet fluid under pressure through orifice 31. For example, in the closed mode of valve 10 illustrated in FIG. 1, inlet fluid under pressure is directed into chamber 24 through outlet 35 of metering passage 30. From there, the inlet fluid equalizes across sealing device 28 to the area of chamber 24 above the sealing device. Thus, it should be understood that inlet fluid is equalized in chamber 24 on both sides of sealing device 28.

Valve 10 also preferably includes a valve bonnet 50. As illustrated in the figures, stem member 18 is disposed through valve bonnet 50. Spring 40 resides between a seat 54 defined in valve bonnet 50 and a seat 55 defined in plunger 52. Bonnet 50 may be a decorative component since it is the portion of the valve which generally extends above the wash basin or sink. The other components of the valve are operably mated with bonnet 50, for example, by being threaded or press fitted therewith.

Valve 10 also includes an outer sleeve member 32 which is concentric about inner sleeve member 20. In a preferred embodiment illustrated in the figures, outer sleeve member 32 is formed integral with valve body 12. In this configuration, inner sleeve member 20 rests against a seat 66 defined by valve body 12 and outer sleeve member 32. Thus, in assembly of the valve, it is a relatively simple procedure to fit inner sleeve member 20 within outer sleeve member 32. Although not illustrated particularly in the figures, it should be understood that there is a non-sealing relationship between outer sleeve member 32 and inner sleeve member 20 so that fluid can travel between the two sleeve members. In other words, the interface between the sleeve members is not fluid tight.

As an important feature of the present invention, a vent passage 34 is defined from a location above sealing device 28 to a location below sealing device 28 in the closed mode of the valve as shown in FIG. 1. Vent passage 34 defines a vent for any air entrapped above sealing device 28 and, thus, eliminates chattering of the valve and insures complete closure of the valve. Vent passage 34 includes at least one set of holes defined completely through inner sleeve member 20. In the illustrated embodiment, vent passage 34 includes a first hole 36 and a second hole 38. Holes 36 and 38 are defined completely through inner sleeve member 20 so as to be in fluid communication with the fluid path which exists between inner sleeve 20 and outer sleeve 32. Thus, the holes 36, 38 and fluid path 39 between the sleeve members defines a vent path from the space above sealing device 28 to the space below sealing device 28 upon movement of piston assembly 26 to the closed position. It should be understood that this vent passage 34 is not operably defined until sealing device 28 completely passes bottom hole 38 in its upward movement to the closed position. Thus, preferably the vent passage 34 is not defined until just before the piston assembly reaches its completely closed position within chamber 24. Accordingly, second hole 38 is at a longitudinal distance from first hole 36 so that the vent passage is not established until piston assembly 26 has travelled at least one-half of the distance from the open mode to the closed mode. Preferably, second hole 38 is at a distance from first hole 36 so that vent passage 34 is not established until just before piston assembly 26 reaches its closed position. It should also be understood that once vent passage 34 is established, an additional fluid path is also established for the fluid above sealing device 28 to escape to the area below sealing device 28. Thus, once vent passage 34 is established, the piston assembly will move at a quicker rate thereby causing the valve to close at a quicker rate.

Valve 10 also includes a number of O-rings or like sealing devices. For example, O-ring 60 is provided between valve body 12 and inner sleeve member 20 at the stem portion thereof, as well as O-ring 62 being disposed between outer sleeve member 32 and the top portion of inner sleeve 20. These O-rings insure that the fluid path between the inner and outer sleeve members is defined only between O-rings 62 and 60 respectively. O-ring 58 is provided between stem member 18 and the stem portion of sleeve member 20 to insure that the only passage for fluid to chamber 24 is through orifice 31. O-ring 64 is provided between stem member 18 and the top portion of inner sleeve member 20 to seal the metering passage 30. O-ring 56 is provided between metering screw 46 to insure that fluid does not leak from metering passage 30 and the bore defined through stem member 12.

An important feature of the present invention is the fact that the static pressure forces are balanced in order to reduce the forces required to actuate the valve. This is accomplished by sizing the O-ring sealing areas to minimize the static pressure force holding the cartridge closed. In FIG. 1, for example, the O-ring sealing areas that control loading of the device are 14, 58, and 64. The areas of O-rings 14 and 16 load the stem upward, while the area of O-ring 58 supplies a downward force. The area of ring 58 is substantially equal to the sum of the other two areas (14 and 64), and the static forces are thus minimized.

In operation, the device functions as follows. In FIG. 1, the valve 10 is shown in its static closed mode. Inlet fluid under pressure completely fills chamber 24 above and below sealing device 28. To open the valve, an operator presses on plunger 52 against the biasing force of spring 40 to move stem member 12 and associated piston assembly 26 to the open position illustrated in FIG. 2. As the piston assembly is moved to the close position, fluid below sealing device 28 is directed around cup flange 48 of the sealing device to the area above piston assembly 26. Upon releasing plunger 52, the force of spring 40 causes the stem member 18 and piston assembly 26 to move upwards to the closed position. However, the rate of movement of the piston assembly 26 to the closed position is limited by the escape of fluid above sealing device 28 through metering passage 30. The fluid above sealing device 28 cannot pass around the flanges of cup seal 48 since the pressure of the fluid forces the flanges outward to seal against inner diameter 22 of inner sleeve member 20. Thus, as piston assembly 26 moves upwards, fluid above sealing device 28 is forced out inlets 33, through metering passage 30, and out outlets 35 to the space below sealing device 28. The position of metering screw 46 will determine the size of passage 30 and thus the rate at which the fluid is metered through the metering passage.

As long as the flanges of sealing device 28 are below the bottom hole 38, vent passage 34 is not operable. For example, referring particularly to FIG. 2, since hole 38 is above cup seal 48, there exists no passage for the fluid to a location below the seal. Any fluid forced out hole 36 will simply be directed back through hole 28 to the space above the seal.

Upon release of plunger 52, piston assembly 26 moves upwards. At some point in its travel, the flanges of cup seal 48 will pass over bottom holes 38. At this instant, vent passage 34 is established in that any air or fluid entrapped above cup seal 48 can now vent to the space below the seal through hole 36, fluid path 39 between the inner and outer sleeve members, and back through hole 38 to the space below the seal. This additional vent passage will also cause the valve to close at a relatively faster rate once bottom hole 38 is by-passed by the flanges of cup seal 48. Thus, periodic manual purging of the valve is eliminated.

It will be apparent to those skilled in the art that various modifications and variations can be made in the present invention without departing from the scope or spirit of the invention. For example, features illustrated or described as part of one embodiment may be used in another embodiment to yield still a further embodiment. It is intended that the present invention cover such modifications and variations as come within the scope of the appended claims.

What is claimed is:

1. An automatically closing self-venting metering valve for metering the flow of a fluid, comprising:
   a valve body having an inlet passage and an outlet passage defined therein, and a movable stem member disposed between said inlet passage and said outlet passage so as to seal said inlet passage from said outlet passage in a closed mode of said valve and to define a fluid, path from said inlet passage to said outlet passage in an open mode of said valve, said stem member being biased to said closed mode;
   an inner sleeve member configured with said valve body and having an inner diameter surface defining a chamber, said stem member being movable through said chamber;
   a piston assembly disposed within said chamber and configured with said stem member to move therewith; said piston assembly being movable to said open mode upon actuation of said stem member and automatically movable from said open mode to said closed mode upon release of said stem member, said piston assembly including a sealing device configured to sealingly engage with said inner sleeve member inner diameter surface during movement of said piston assembly to said closed mode;
   a bypass associated with said piston assembly allowing fluid to pass from below said piston assembly to above said piston assembly during movement of said piston assembly to said open mode;
   a metering passage defined through said stem member between a location above said sealing device to a location below said sealing device, the rate of return of said piston assembly from said open mode to said closed mode being dependent upon the time required for fluid in said chamber above said sealing device to be metered through said metering passage to below said sealing device;
   an outer sleeve member concentric about said inner sleeve member with a fluid path defined between said inner and outer sleeve members; and
   at least one vent passage defined from a location above said sealing device to a location below said sealing device in said closed mode, said vent passage including at least a first hole defined above said sealing device completely through said inner sleeve member to said fluid path and at least a second hole defined below said sealing device from said fluid path completely through said inner sleeve member in said closed mode of said piston assembly, said vent passage thereby being established only upon said sealing device passing across said second hole in its movement from said open mode to said closed mode so that said vent passage vents air and fluid entrapped above said sealing device to pass to the other side of said sealing device there by causing said piston assembly to close at a quicker rate.

2. The metering valve as in claim 1, wherein said stem member is spring biased to said closed mode.

3. The metering valve as in claim 1, further including an adjusting device for variable adjusting said metering passage and thereby adjusting the metering rate of said valve.

4. The metering valve as in claim 3, wherein said adjusting device comprises a metering screw configured through said stem member into said metering passage.

5. The metering valve as in claim 1, wherein said outer sleeve member is formed integral with said valve body.

6. The metering valve as in claim 1, wherein said sealing device comprises a cup seal.

7. The metering valve as in claim 1, further including a valve bonnet, said stem member extending through said valve bonnet, said outer sleeve member being matable with said valve bonnet.

8. The metering valve as in claim 1, wherein said second hole is at a longitudinal distance from said first hole so that said vent passage is not established until said piston assembly has travelled at least one half of the distance from said open mode to said closed mode.

9. The metering valve as in claim 8, wherein said second hole is at a longitudinal distance from said first hole so that said vent passage is not established until just before said piston assembly has reached said closed mode.

10. An automatically closing self-venting metering valve for metering the flow of a fluid, comprising:
    a sleeve member defining a chamber, and a movable piston assembly disposed within said chamber, said piston assembly including a sealing piston movable within said chamber between an open mode and a closed mode;

an actuating device associated with said piston assembly for moving said piston assembly to said open mode, said piston assembly automatically returning to said closed mode upon release of said actuation device;

a variable metering passage defined in said piston assembly defining a path for fluid in said chamber entrapped above said sealing piston to pass to below said sealing piston upon movement of said piston assembly from said open mode to said closed mode;

a bypass path associated with said sealing piston allowing fluid to pass from below said sealing piston to above said sealing piston during movement of said sealing piston to said open mode; and a separate vent passage defined completely out of said chamber from a point above said sealing piston in its closed mode to a point back into said chamber below said sealing piston, said vent passage including at least one pair of holes defined through said sleeve member, said vent passage being established only upon said sealing piston passing across one of said pair of holes in its movement from said open mode to said closed mode so that said vent passage vents air and fluid entrapped above said sealing piston to pass to the other side of said sealing piston thereby causing said piston assembly to close at a quicker rate.

11. The metering valve as in claim 10, further including an inlet passage and an outlet passage, said piston assembly further comprising a stem member movable between said inlet and outlet passages.

12. The metering valve as in claim 10, wherein said metering passage further comprises a variably positionable screw for varying the volume of said metering passage.

13. The metering valve as in claim 10, further comprising a second sleeve member concentric about said first sleeve member with a fluid path defined between said sleeve members, said vent passage including a portion of said fluid path.

14. The metering valve as in claim 13, further comprising a plurality of said pairs of holes, first holes of said pairs being defined through said first sleeve member at a location above said sealing piston in its closed mode, and second holes of said pairs being defined at a location below said sealing piston in its closed mode.

15. The metering valve as in claim 10, wherein said actuating device comprises a spring biased plunger connected with said piston assembly, said plunger spring biased to said closed mode.

* * * * *